United States Patent [19]
Park et al.

[11] Patent Number: 6,103,153
[45] Date of Patent: Aug. 15, 2000

[54] PRODUCTION OF FOAMED LOW-DENSITY POLYPROPYLENE BY ROTATIONAL MOLDING

[76] Inventors: Chul B. Park, 95 Prince Arthur Avenue, #521, Toronto, Ontario, Canada, M5R 3P6; Guobin Liu, 1545 Ouelleppe Ave., Apt. 202, Windsor, Ontario, Canada, N8X 1K6; Fangyi Liu, 810-30 Charles Street West, Toronto, Ontario, Canada, M4Y 1R5; Remon Pop-Iliev, 801-25 Warrender Ave., Etobicoke, Ontario, Canada, M9B 5Z4; Salvatore D'Uva, 36 Beechwood Avenue, Brantford, Ontario, Canada, N3R 6Z2; Benjamin Zhang, 40 Mohawk Road East Apt. 316, Hamilton, Ontario, Canada, L9A 2G7

[21] Appl. No.: 09/324,047

[22] Filed: Jun. 2, 1999

[51] Int. Cl.[7] .................................. B29D 9/00; C08J 9/34
[52] U.S. Cl. .......................... 264/45.7; 264/54; 264/45.5; 521/51; 521/142; 521/143
[58] Field of Search ........................... 264/54, 45.7, 45.5; 521/51, 142, 143

[56] References Cited

U.S. PATENT DOCUMENTS

| | | | |
|---|---|---|---|
| 3,962,390 | 6/1976 | Mori et al. | 264/45.7 |
| 4,440,899 | 4/1984 | Peerkamp | 264/45.7 |
| 5,532,055 | 7/1996 | Igrashi et al. | 521/51 |
| 5,783,601 | 7/1998 | Strebel | 264/45.7 |
| 5,830,392 | 11/1998 | Strebel | 264/45.7 |
| 5,928,584 | 7/1999 | Lee | 264/45.7 |

FOREIGN PATENT DOCUMENTS

| | | |
|---|---|---|
| 983226 | 11/1972 | Canada . |
| 7251579R | 11/1969 | Japan . |

*Primary Examiner*—Morton Foelak
*Attorney, Agent, or Firm*—Ridout & Maybee

[57] ABSTRACT

Compositions and processing conditions are disclosed for the production by rotomolding of polypropylene foams, hither to satisfactorily produced only by injection molding and extrusion molding. Rheological properties of the polypropylene resin, processing conditions and choice of composition of the chemical blowing agent were found to play important roles in obtaining high quality polypropylene foam structures. High strength fine-cell polypropylene foams could in particular be formed by first melt compounding a suitable chemical blowing agent with the resin under conditions which allow for homogeneous mixing without appreciable decomposition of the blowing agent.

8 Claims, 8 Drawing Sheets

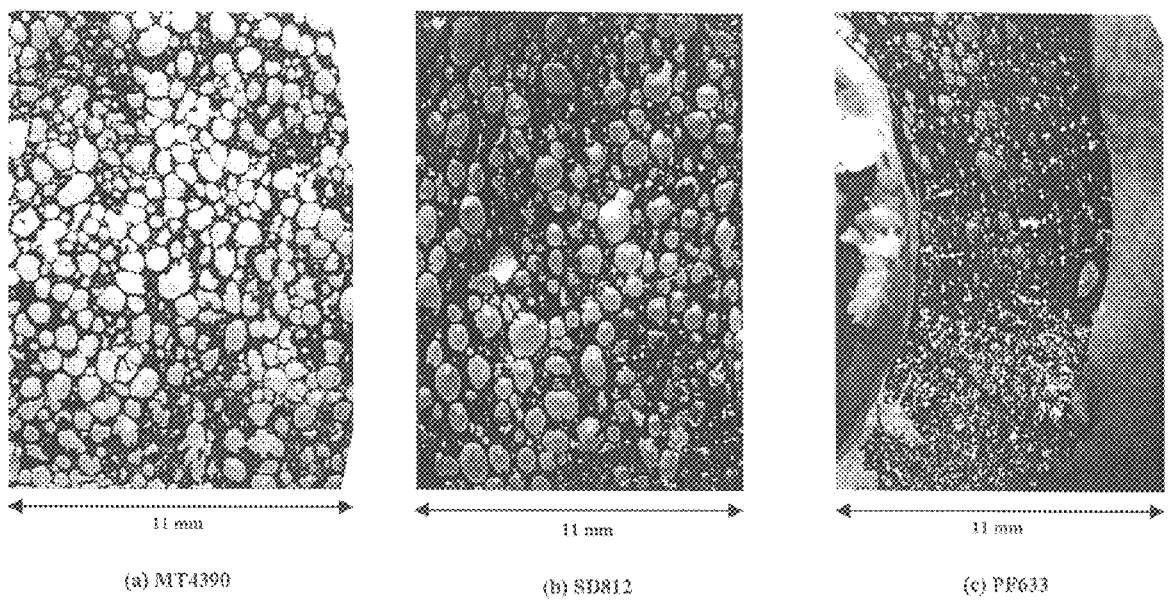
Figure 4: Comparison of Materials (3.5X)

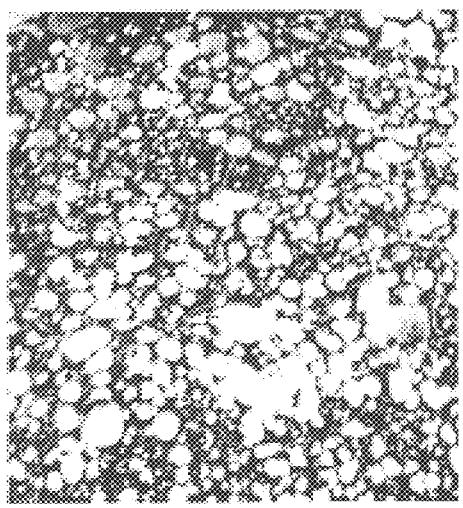 
Compounded        Dry Blended
Figure 6: PF633 + 1.25% 50AZ/50ZnO
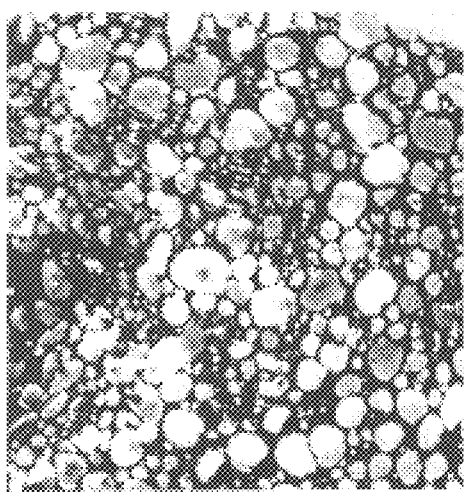 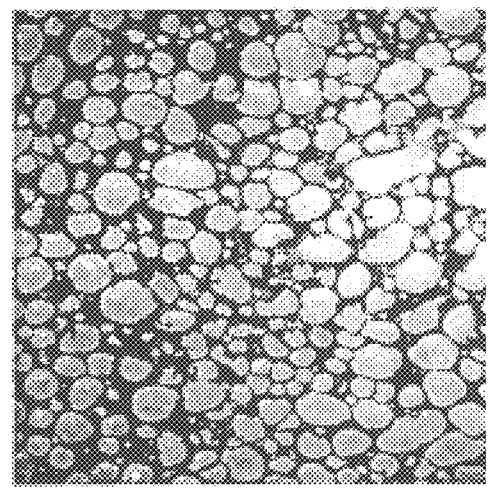
Compounded        Dry Blended
Figure 7: MT4390 + 1.25% 50AZ/50ZnO

PRODUCTION OF FOAMED LOW-DENSITY POLYPROPYLENE BY ROTATIONAL MOLDING

BACKGROUND OF THE INVENTION

For the last three decades, rotomolding (or rotational molding) of plastics has received much attention because of the low machinery cost, simple tooling, and low level of waste involved. Rotomolding is currently one of the fastest-growing processes in the plastic industries, expanding at an annual rate of 25 to 30%.

A detailed discussion of the rotomolding process and specific plastics resin materials, is referred to in the article appearing in Modern Plastics Encyclopaedia (1995) at page D171, the disclosure of which is hereby incorporated by reference. For a discussion of the properties of various foamed plastics and of the foaming process itself, reference is made to the article entitled "Cellular Plastics", in the Encyclopaedia of Polymer Science and Engineering, Vol 3, pp. 1–59 (1985), the disclosure of which is herein incorporated by reference.

Conventional rotomolding has been used mainly for the production of large solid, hollow articles with a very uniform wall thickness, hereinafter referred to as "conventional rotomolding". However, recent developments in rotational foam molding have demonstrated that the technology may also be used to make low-density, fine-cell plastic foam articles ("rotational foam molding"). A foamed component may advantageously be used to fill up the hollow rotomolded product to enhance its physical and mechanical performance for various end applications.

By introducing a physical or a chemical blowing agent (CBA) into a polymer matrix, foam structures can be produced having low specific weight, low thermal conductivity and energy absorption properties useful in applications in the packing industry, automobile parts and construction industries.

Basically, the foaming process consists of three steps: (i) the creation of small discontinuities or cells in plastic melts; (ii) growth of these cells to a desired volume; and (iii) stabilization of the resulting foam structure. Physical blowing agents such as $CO_2$, $N_2$, or low-boiling liquids and chemical blowing agents (which produce carbon dioxide or other gases by chemical reaction) are used for creating cells in plastic melts. Gases or volatile liquids are generally injected directly into the polymer melts at high temperature and pressure. Chemical blowing agents (CBAs), by contrast, are blended with the plastic pellets or powders and undergo gas-forming thermal decomposition during the melting/molding process.

The most widely used commercial products are polystyrene (PS) foams, particularly in the field of packing and food containers. Polyethylene (PE) foams have also been produced by various processing methods. Polyethylene resin is widely in current use in rotational molding applications, both in foamable and in non-foamable resin compositions. Reference is made, for example, to the polyethylene-based compositions for rotational molding which are disclosed in U.S. Pat. Nos. 5,366,675 and 5,532,282 issued to Needham.

For many applications, however, the respective service temperatures of about 100° C. and 125° C., respectively, for PS and PE foams are too low. Their use as structural materials is also limited by reason of the low impact strength of PS foams and the low modulus of PE foams. In comparison with PS and PE, polypropylene (PP) has a much higher melting temperature, approximately 160° C. PP-based materials also exhibit a much higher impact strength than PS and a higher stiffness than PE, recommending PP as a good candidate for the production of high-strength foam structures.

Although PE is much more amenable to known foaming procedures than is PP, PP foams are preferable for those applications where stiffness, chemical resistance, good heat insulation, sound deadening and higher end-use temperatures are required. Examples include the automotive industry ("under-the-hood" high service temperature parts, interior, and cushioning applications) and insulation for domestic and commercial hot water and air conditioning pipes.

Unfortunately, the melt strength of PP decreases very quickly with an increase in temperature above its melting temperatures, leading to a narrow processing "window" and attendant great difficulties in foam processing. Quite typically, attempts to foam PP result in very small cell population densities and large average cell sizes and/or lack of uniform structure. Consequently, there are currently very few practical PP foam applications.

Several processing technologies are being developed for the production of PP foams, including extruded PP foams, injection molded PP foams and the processing of foams from expandible PP beads. For example, U.S. Pat. No. 4,940,736 (Alteepping et al.) discloses a composition of 70–90 wt % of low-viscosity polypropylene component having a melt viscosity of less than $2 \times 10^3$ poise and 30–10 wt % of high viscosity polypropylene component (greater than $2.5 \times 10^3$ poise). Using CFCs as a physical blowing agent, this mixture of polypropylenes was extruded to produce a fine-cell polypropylene foam.

In an article appearing in the March 1991 edition of Plastics Engineering, entitled "Novel Polypropylene for Foaming in Conventional Equipment", the authors N. B. Bradley and E. M. Philips discuss high-melt strength polypropylene homopolymers.

In a subsequent article appearing in the Sep. 20, 1995 edition of the Proceedings of Scotland Polyolefins Conference, entitled "A New Family of High Melt Strength Polypropylene Copolymers for Extruded Low Density Foam Applications", V. P. Bavaro describes long-chain branched high melt-strength propylene-ethylene copolymers for extruded low density foam applications.

However, we found the information provided in prior descriptions of extrusion or injection molding of PP homopolymers and copolymers not to be directly pertinent or instructive for the formulation of useful foamable polypropylene-based resin compositions for rotational molding.

In the rotational foam molding process, a foamable plastic blend or powdered plastic composition is put into a closed mold and exposed to heat while the mold is rotated. As a result, the foamable plastic materials become sticky, adhere to the inner surface of the mold layer by layer and ultimately sinter to form a uniform liquid layer.

At the time when the temperature of the melt reaches the onset decomposition temperature of the CBA, the CBA particles begin to decompose and liberate gas thereby initiating the foaming processs of the plastic. Once the predetermined time for the heating cycle has elapsed, the process proceeds with the cooling cycle. After sufficient cooling, rotational movement of the mold is stopped and the finished part is removed. The foamed material comprises a continuous phase (polymeric matrix) with a discontinuous gas phase distributed through the matrix. As noted above, the foaming process involves the creation of small discontinuities or cells, the growth of the cells to a desired volume and stabilization of the resultant foam structure.

Quite unlike the extrusion molding and the injection molding processes, in the process of rotational molding the predominant force leading to polymer flow within a mold is simply that of gravity. The gravitational force imposes very low shear stresses and shear rates, typically in the range of $10^{-2}$–$10^{-6}$ s$^{-1}$. Shear rates characterizing extrusion and injection molding processes are typically in the range of $10^2$–$10^3$ s$^{-1}$, and $10^3$–$10^4$ s$^{-1}$, respectively. It is therefore not surprising that quite different process parameters come into play in preparing fine-celled PP foam by rotational foam molding.

SUMMARY OF THE INVENTION

It is a principal object of the present invention to provide polypropylene rotomolding compositions and processing conditions which will produce fine cell foams.

It is a further object of the invention to provide a process for the rotational foam molding of polypropylene articles in which a desired volume expansion ratio is achieved while minimizing the cell size and maximizing the cell-population density and uniformity of distribution.

These objects are achieved by the selection of a CBA and a promoter to release foaming gas into the polypropylene resin at a temperature which is high enough to avoid undesirable effects of poor sintering, but low enough to avoid foaming the resin when its melt strength is too low to support proper cell formation.

BRIEF DESCRIPTION OF THE DRAWINGS

FIGS. 4(a), 4(b) and 4(c) are photomicrographs of rotationally foamed polypropylene resins illustrating the effect of resin choice on the expanded cell morphology obtained;

FIG. 6 is comparative photographs of the cell morphologies resulting from the dry-blending method on one hand and the compounding method on the other hand for a first polypropylene resin; and FIG. 7 is comparative photographs of the cell morphologies resulting from the dry-blending method on one hand and the compounding method on the other hand for a second polypropylene resin.

DETAILED DESCRIPTION OF THE INVENTION

We have found that acceptable PP-based foam articles may be prepared by rotomolding compositions prepared according to either of two different processing technologies. These will be referred to in what follows as the "dry-blending" process and the "melt compounding" (or, simply, "compounding") process.

(i) Dry-blending Process

Figure 1:
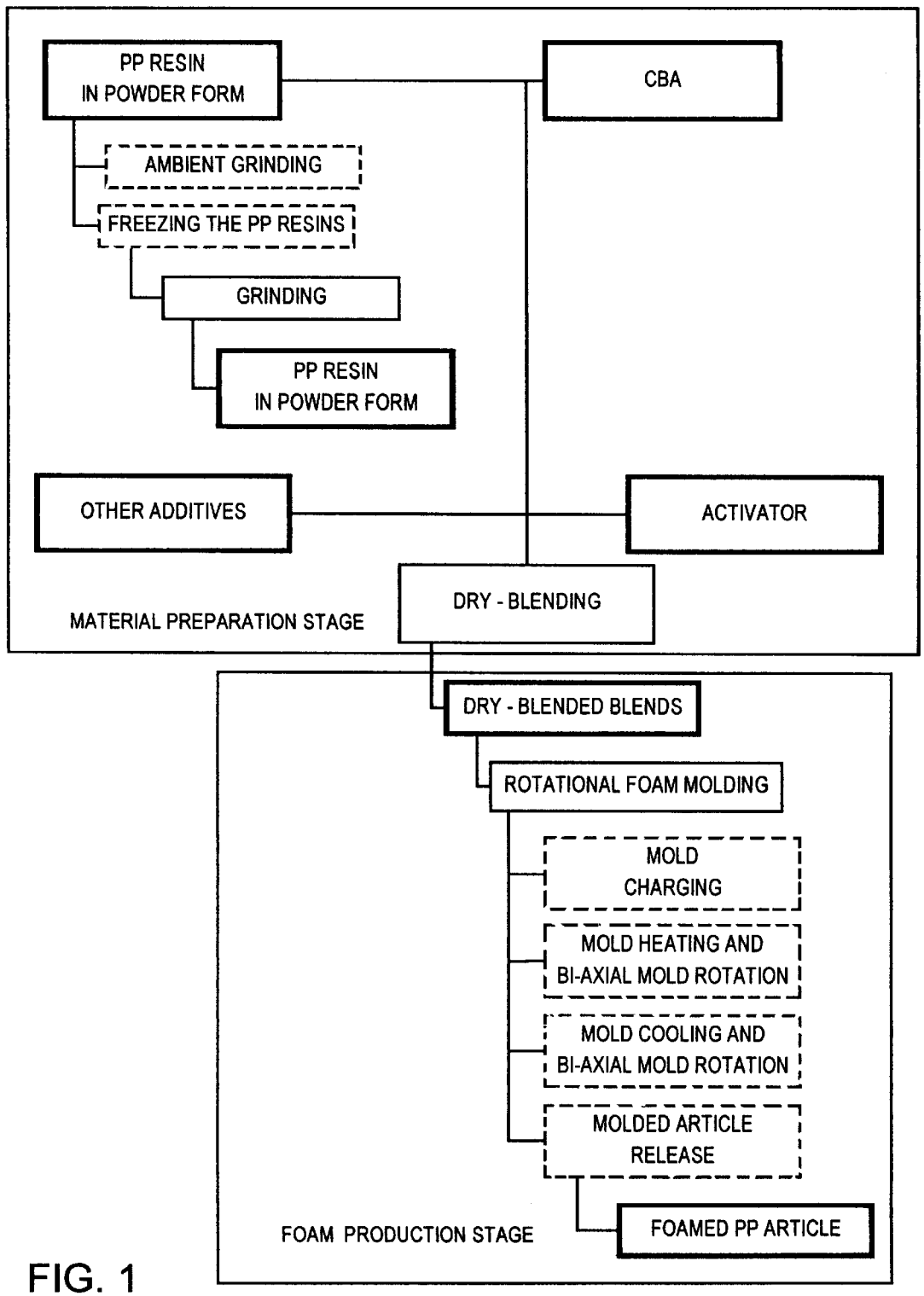
FIG. 1 is a flowchart illustrating in general terms the rotational foam molding process based on dry blending.

In preparing rotomolding compositions by dry-blending, PP pellets are first ground into powder and mixed with CBA particles and other additives by dry-blending, prior to being charged into a rotational mold. The rotational mold is then placed into a hot oven and rotated about two perpendicular axes to produce a foam structure. FIG. 1 illustrates by means of a flow chart the generalized dry blending-based rotational foam molding process for PP.

We have found that for the rotomolding of dry-blended PP resin compositions, good foams may most easily and reproducibly be manufactured by using PP materials having a melting flow rate (MFR) of greater than about 15 dg/min. If the MFR is too high, however, cell coalescence and cell coarsening will occur.

We have also concluded that it is important that the polymer material should be well sintered before the decomposition of the CBA, since it is sintering that allows entrapped air pockets to be isolated and reduced in size so that it is the CBA particles which primarily serve as nuclei for cell growth. Otherwise, nucleation is dominated by cavities formed among the polymer particles, which can connect together to form outsize, undesirable cells and/or provide channels for gas escape resulting in poor expansion of the foam.

Our studies also indicate that the decomposition behaviour of the CBA is an important factor in the quality of PP-based foam produced. As suggested above, too early decomposition of the CBA particles results in poor sintering of the polymer matrix, with the problems noted, but decomposition of the CBA at too late a stage in the molding process results in a weak melt strength at higher temperatures. Accordingly, it is desired that the CBA decompose as soon as possible after sintering is complete. This we have achieved by judicious addition of an accelerating agent as additive, to dry-blended compositions.

Further parameters affecting final foam structure are oven temperature and heating rate, which must be controlled to effect good sintering of the polymer matrix.

The present application is not to be limited to any particular physical theory as to the reasons why the selective control of parameters such as MFR affords success in rotomolding PP compositions. However, we believe that the mechanism generally follows these stages:

(a) At the outset of the rotomolding process, the plastic powders get sticky and sinter as temperature increases. Small air pockets are trapped in the interstices between the particles of plastic. This contrasts with extrusion and injection molding processes in which high shear or high pressure leads to a more uniform mixture of plastic melt and particles of chemical blowing agent.

(b) At a second, later stage before the sintering of plastic powders is complete, cell nucleation arises at the trapped air pockets and also by the decomposition of added chemical blowing agent.

(c) The third stage, cell growth, follows cell nucleation. It is believed that a sufficiently high MFR (greater than 15 dg/min) of the plastic resin is essential for stable cell growth, to allow nucleated cells to encounter the minimum resistance possible while growing.

(d) When adjacent cells impinge on each other, a liquid wall is formed, and in the late stages of cell growth there is extensional melt flow of resin in the liquid wall. This requires that the selected resin has a sufficiently low MFR (lower than 20 dg/min) in order to prevent ruptures of the liquid wall and detraction from fine-cell foam structure by cell coalescence and cell coarsening.

(ii) Melt Compounding Process

Figure 2:
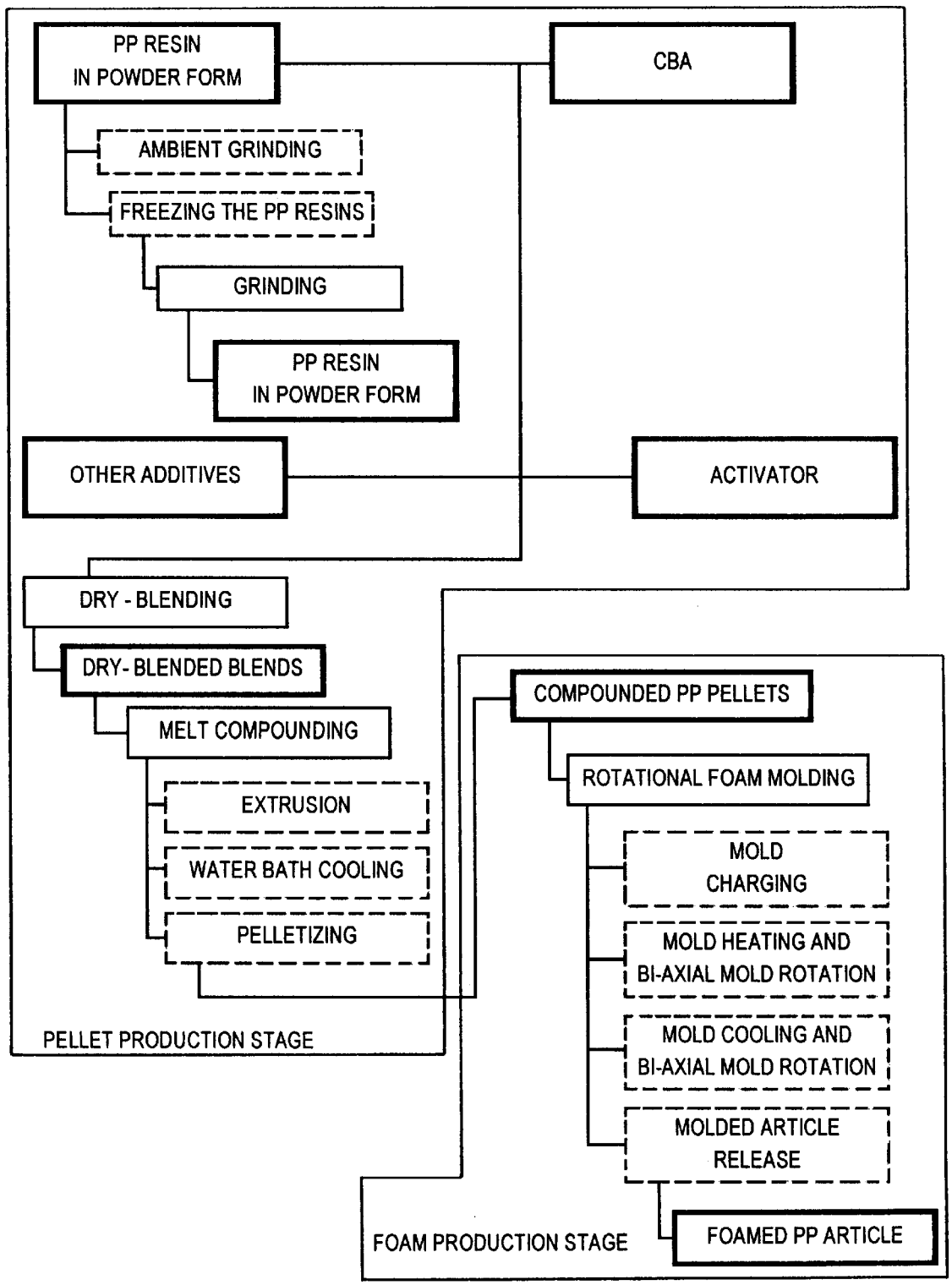
FIG. 2 is a flowchart illustrating in general terms the rotational foam molding process based on compounding.
Figure 3A:
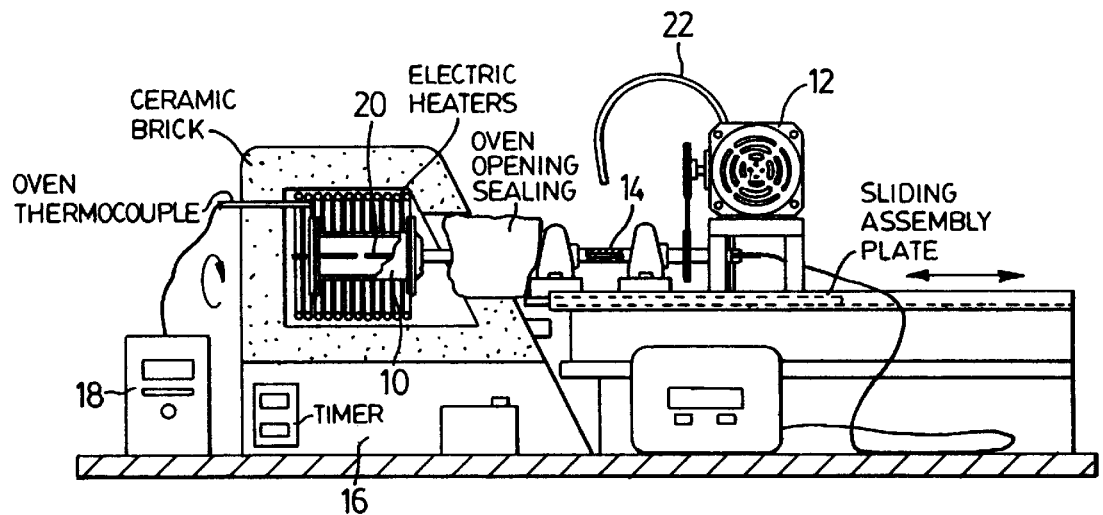
FIGS. 3(a) and 3(b) are schematic illustrations of the uni-axial lab scale rotomolding machine used in carrying out the experiments discussed herein, FIG. 3(a) showing the configuration of the machine during the mold heating step and FIG. 3(b) during the mold cooling step.
Figure 3B:
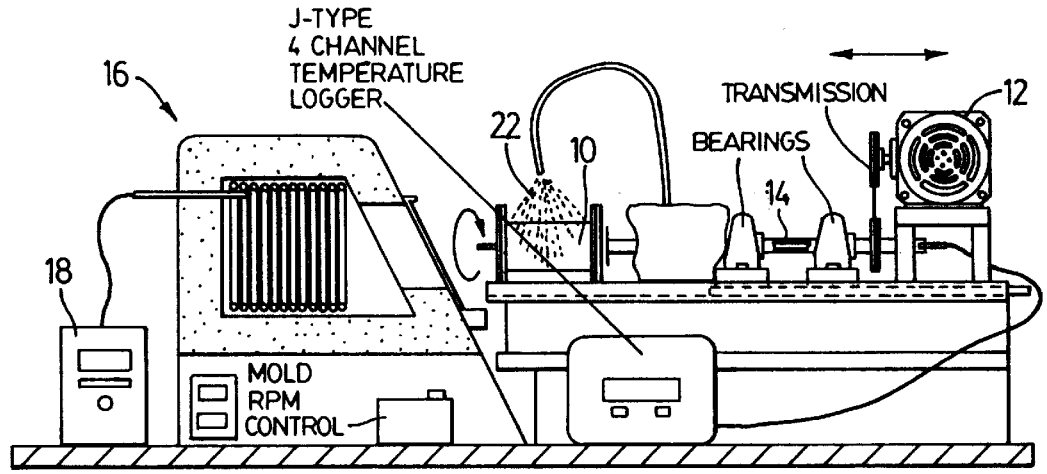

Turning to the other of the two processes for making PP rotomolding compositions according to the present invention, "compounding" refers to the process of mixing the CBA particles intimately through the polymer resin using an extrusion compounder. The substantially homogeneous extruded mixture of PP resin, CBA and any desired additives is then cut into pellets which can be rotationally molded. Only pre-compounded plastic pellets are charged into the mold. The melt compounding process apparently helps to achieve uniform cell distribution and removal of entrapped air pockets. The generalized compounding-based rotational foam molding process for PP is illustrated in FIG. 2, by means of a flow chart.

We have found that such uniform distribution of CBA particles through the melt compounded polymer matrix greatly reduces the need to control the sintering of polymer particles, which was of critical importance for dry-blended compositions. The foaming process in melt-compounded compositions is essentially dominated by the decomposition behaviour of CBAs in the resin. Accordingly, a much greater range of materials can be used for producing PP foams by this technique. In particular, with high melt strength materials, a very large expansion ratio foam structure can be obtained, not usually achievable by the dry-blending process.

In selecting a CBA, important properties to be considered are the temperature at which the expanding gas is liberated, the temperature of initial decomposition of the CBA, the temperature range of the maximum rate of decomposition, the gas yield (volume of gas, in $cm^3$, liberated by the transformation of 1 gram of CBA per unit time, usually 1 minute, at the temperature of maximum gas liberation), the rate and kinetics of the liberation of gas, and the pressure developed by the gas.

Having selected at the outset the basic plastic resin to be molded (polypropylene), the type of basic processing technology (compounding-based rotational foam molding) and the level of desired quality of the foam (fine-cell), the success of the foaming process is extremely sensitive to the type and properties of the chemical blowing agent selected. The properties of the CBA will affect each step of the foaming process, by imposing limits on the processing strategy, the quality of the foam, the economy of the foamed product and its end-use application.

(iii) Experimental Results

Figure 5:
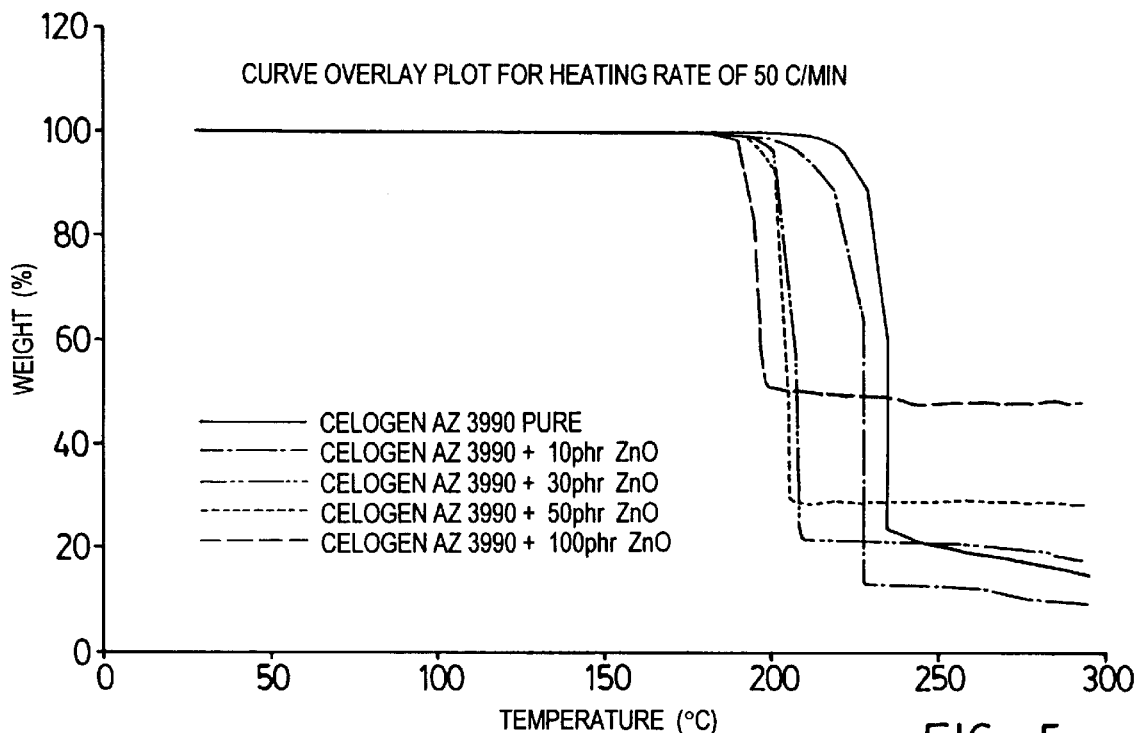
FIG. 5 comprises graphical representations of thermogravimetric analysis results showing the decomposition behaviour of a particular chemical blowing agent as a function of added zinc oxide for a heating rate of 50° C./min.
Figures 1, 5:
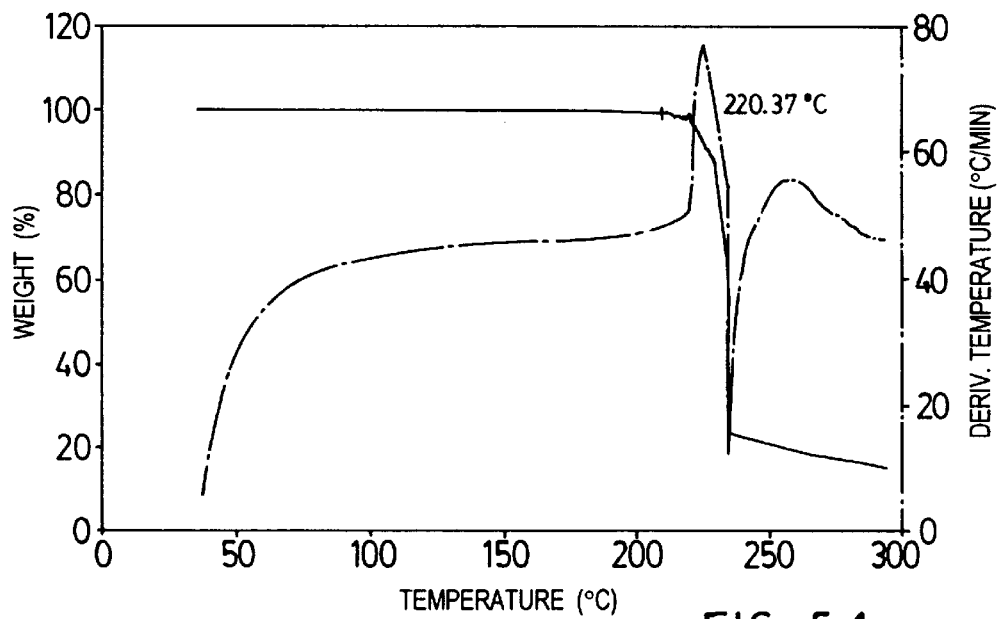
Figures 2, 5:
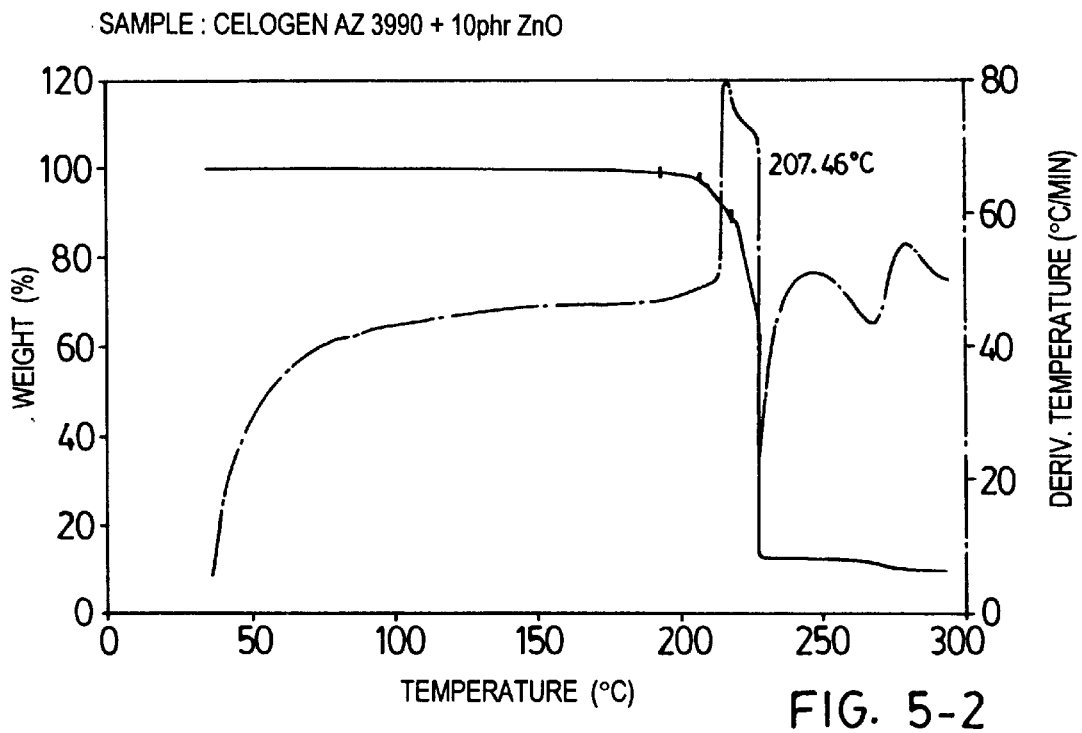
Figures 3, 5:
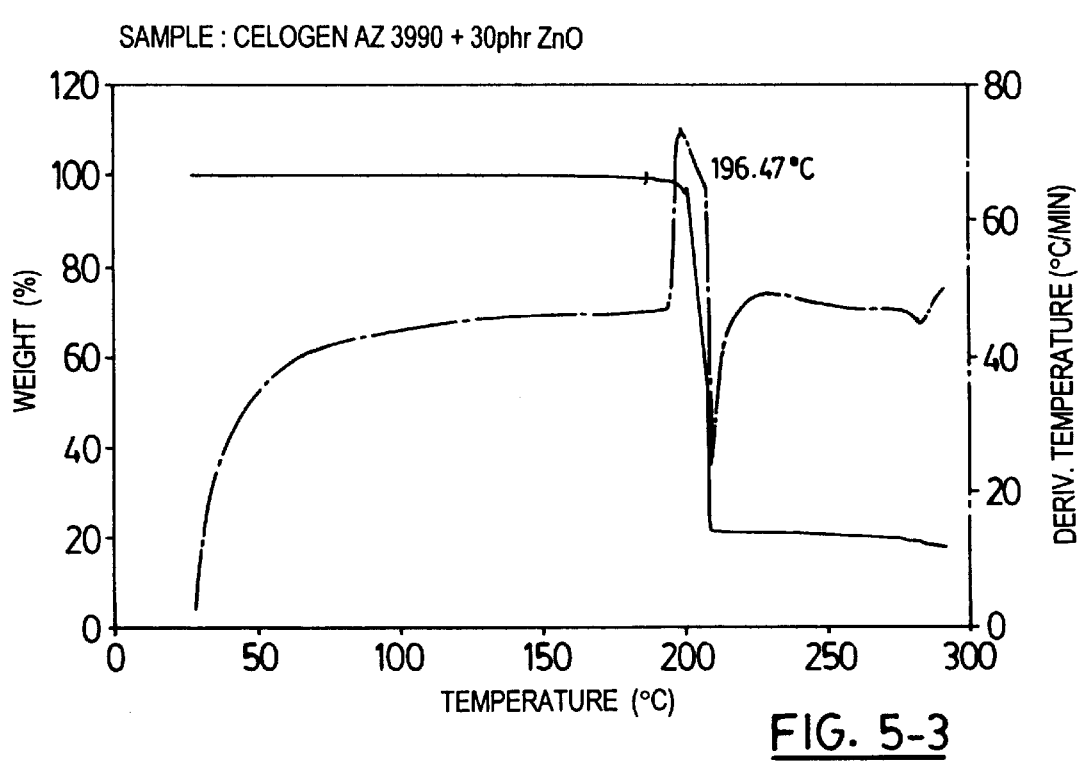

Rotational foam molding experiments were carried out on a uni-axial lab scale rotomolding machine schematically illustrated in FIG. 3. The rotomolder comprises a cylindrical aluminum mold 10, a motor and gear box assembly 12, a hollow shaft 14, an oven 16, a temperature controller 18 with associated in-oven thermocouple 20 and a water cooling system 22. An additional thermocouple is disposed in the centre of hollow shaft 14 to monitor the temperature in the centre of mold 10. The dimensions of the mold were 1.25 inches diameter and 4.00 inches in length. The polypropylene-based resins used in the experiments discussed below are listed in Table 1. These exhibit a range of melting flow rates (MFR) from about 2 to about 50 dg/min.

In commercial practice, biaxial rotation is the most common method of mold rotation, both for rotational foam molding and in conventional rotomolding. Usually, the axes of rotation are perpendicularly located for achieving a simpler mechanical design of the mold-mounting assembly.

A higher rotational speed is usually imparted to the mold about its major axis and a lower rotational speed about its minor axis, for the purpose of evenly distributing plastic material during the heating cycle on the internal surfaces of the mold.

Viscosity measurements of polymeric materials, at the low shear rates encountered in rotational molding, approach a limiting constant value known as the "zero-shear viscosity". Where a value is given for the zero-shear viscosity of a material in Table 1 below, the measurement was made using a rotational stress rheometer (Rheometric scientific, SR-200) at a shear rate of $0.005s^{-1}$ at a temperature of 190° C.

Seven PP resins with different grades of viscosity, different molecular structures, and different melt strengths were selected for experimentation. The PP resins are described by their respective manufacturers as follows: Pro-fax PF633 of Montell Canada (PF633) is a high melt strength (HMS) PP homopolymer resin, Pro-fax SD812 of Montell Canada (SD812) is a HMS PP medium impact copolymer resin for extrusion coating, Quantum Microthene MT4390-HU is a rotomolding-grade PP copolymer resin, while Pro-fax SD242 of Montell Canada (SD242) is a nucleated, high flow, medium impact copolymer resin. Among these resins, only MT4390 was supplied in a powder form and was therefore used as supplied, while the remaining three were subjected to grinding prior to usage.

Table 1 presents relevant properties of the PP resins selected to be used in the present study:

TABLE 1

| PP Materials | | | |
| --- | --- | --- | --- |
| Material | MFR (dg/min) | Zero-Shear Viscosity (poise) | Manufacturer |
| PF633 | 3–6 | 105,000 | Montell |
| SD812 | 16 | 14,000 | Montell |
| SC1355 | 18 | 13,500 | Borealis |
| MT4390 | 20 | 9,250 | Quantum |
| PF611 | 30 | | Montell |
| SD242 | 35 | | Montell |
| SC873 | 50 | | Montell |

Ideally, the CBA decomposition temperature for rotational foam molding applications should be 50° C. higher than the melting temperature of the polymer, to minimize the amount of gas lost from the polymer surface during foaming. As a number of the various PP resins (homopolymers and copolymers) melt in the range of about 150–175° C., a CBA which decomposes in the range of about 200–225° C. would appear to be best suited for PP foam production. Further, the CBA should be sensitive to activators and to inhibitors, to improve the potential for using the CBA at a broader range of decomposition temperatures. CBA activators (typically metal oxides or salts, or organometallic compounds) act to reduce the effective decomposition temperature of CBAs, while inhibitors have the opposite effect.

A number of candidate compounds for CBAs from the many chemical blowing agents which are commercially available are listed in Table 2, below:

TABLE 2

Some Commercially Available Blowing Agents

| CBAs | $T_{decomp.}$ (°C.) | Thermal Nature | Manufacturer |
| --- | --- | --- | --- |
| Celogen AZ 3990 | 207.07 | Exothermic | Uniroyal Chemcial |
| ADC/M-C1 | 204.21 | Exothermic | Bayers |
| ADC/F | 204.37 | Exothermic | Bayers |
| ADC/F-C2 | 206.30 | Exothermic | Bayers |
| Sodium Bicarbonate | 133.35 | Endothermic | Exxon |
| Celogen OT | 165.80 | Exothermic | Uniroyal Chemical |
| Hydrocerol | 149.48 | Endothermic | BI Chemical |

Azodicarbonamide (ADC) is an exothermic CBA and decomposes in a temperature range of about 200–210° C.

The chemical blowing agent used in the experiments was Celogen AZ 3990 from Uniroyal Chemicals, an azodicarbonamide, which (according to the manufacturer's specification) decomposes at 214° C. with the liberation of 220 cc of gas per gram. Cell nucleation and growth were monitored by stopping a particular rotational molding experiment at regular intervals during processing, taking a sample of the foaming resin and examining the structure of that sample by scanning electron microscopy.

In the case of those flowable resin compositions prepared by melt compounding rather than dry-blending, melt compounding of CBA into the polypropylene-based resin was carried out using a single screw extruder (Brabender 3023-GR-8). The temperature setting along the extruder was selected to be above the melting temperature of the polypropylene materials, but otherwise as low as possible in order to prevent needless pre-decomposition of the CBAs during the compounding process. A suitable extrusion speed was also used to limit pre-decomposition and enhance mixing quality. The compounded pellets were then roto-molded using the same uni-axial rotational molding machine as for the dry blending method, described above in connection with FIG. 3.

(a) Dry-blended Compositions

As noted above, the sintering ability of the polymer material under rotational molding conditions was found to be of critical importance when this processing technique is used. Where polymer particles cannot sinter well, the dry blended mixture will include a large number of air cavities formed amongst the polymer powders during sintering. That is, air bubbles form in the polymer matrix before decomposition of CBA begins. These air bubbles can negatively effect the final cell structure of the foamed material.

We have found a direct relationship between the sintering ability of a polypropylene resin in dry blended compositions and the MFR of that material. With an increase in the MFR, the viscosity of the PP material decreases and the melt flows better in the mold, with a favourable result in terms of removing entrapped air bubbles and promoting good nucleation.

A countervailing factor, however, is that increasing the MFR of PP resins generally leads to a reduction in melt strength. As noted earlier, a low melt strength leads to a greater degree of cell coalescence, which in turn can lead to undesirably low cell density in the foamed material. In the result, the particular choice of polypropylene material depends on the required expansion ratio and end-use properties of the molded article.

Figures 4, 5:
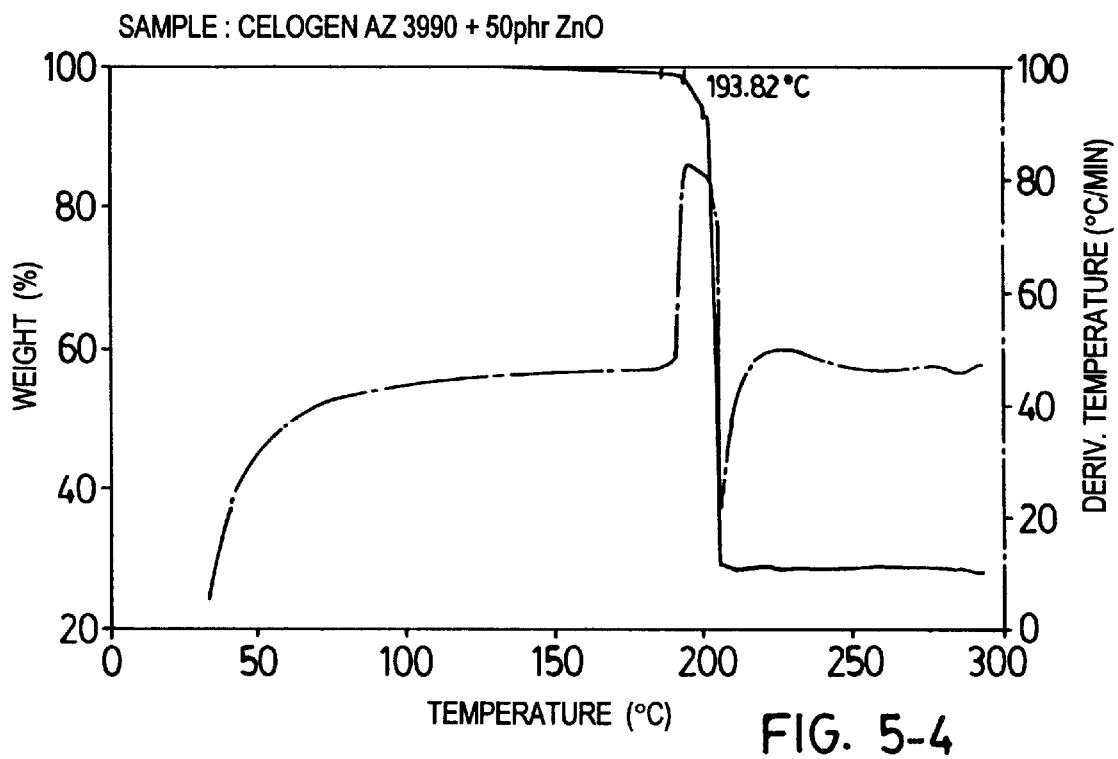
Figure 5:
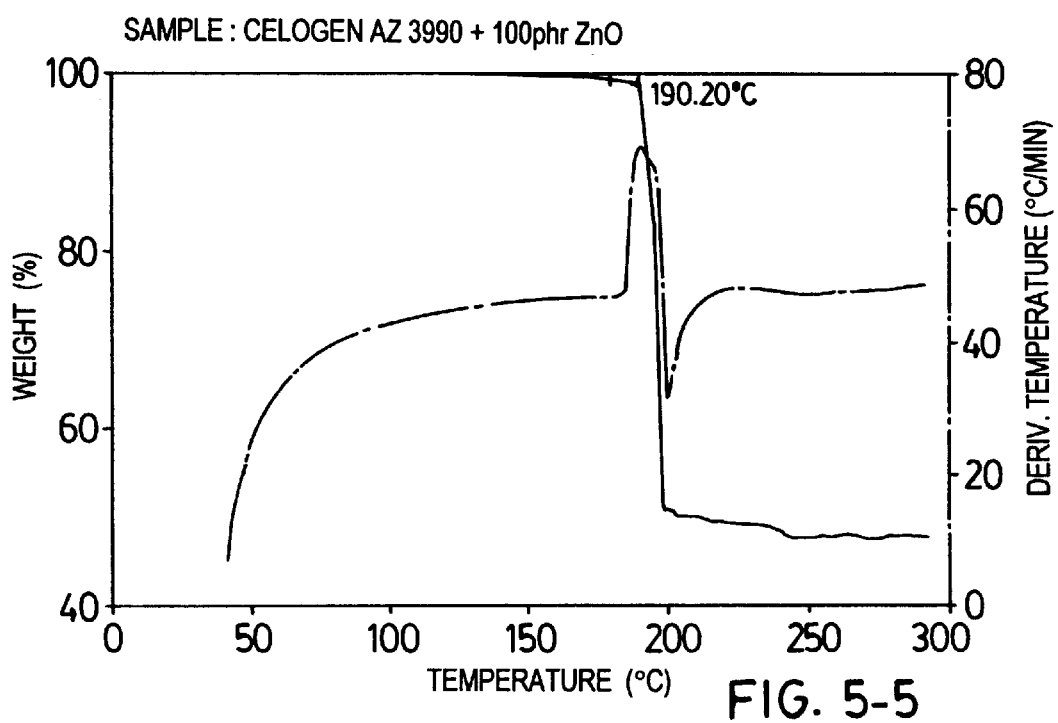

PP materials with MFR in a range from 2 to 50 dg/min were tested. In FIGS. 4 (a) to (c) 3.5-fold magnifications of foam samples intended to undergo three-fold expansion in rotomolding, are shown for three different materials, producing markedly different cell morphologies. It can be seen that for PF633 [4(c)] having the lowest MFR of 3–6 dg/min, no fully expanded foam structure was obtained. This is believed to be the result of gas lost from poor sintering. For the SD812 material [4(b)] having a higher MFR of 16, the cell distribution and cell size were improved, but still inferior to those of MT4390 [4(a)] having an MFR of 20.

We have concluded from all such experiments conducted, that for rotomolding of dry-blended PP materials, acceptable foam qualities can most easily be produced where the resin materials exhibit an MFR greater than 15 dg/min.

We also observed in our experiments a wide range in mechanical properties, depending upon whether homopolymers or copolymers were used as the resin starting materials. A good foam structure can be obtained from homopolymers having a proper range of MFR, but as a rule the end product exhibits an impact strength substantially lower than copolymer foams.

Another controllable factor which we found to be of salutary effect in achieving good foam quality from dry-blended rotomolding compositions is control of the decomposition behaviour of the chemical blowing agent. Too early decomposition leads to poor sintering with the undesirable effects noted above, but decomposition too late leads to weakened melt strength at high temperature for the end product. We have found that judicious addition of ZnO will delay the decomposition of the CBA until full sintering of the polymer material has occurred, so that melt strength of polymer was maintained at the foaming stage.

Illustrated in FIG. 5 is the decomposition behaviour of the chemical blowing agent as a function of added ZnO, shown by five thermogravimetric analyser runs (TGA 2500 from TA Instrument). These are most conveniently comparable in the "Curve Overlay Plot". A decomposition temperature of approximately 180° C. could be achieved by using ZnO in 1:1 proportion by weight to the CBA Celogen AZ 3990, which by itself has a decomposition temperature of about 214° C.

It would naturally be expected that the proper amount of the chemical blowing agent should be used in order to achieve a desired expansion ratio. A simple theoretical calculation based on initial polymer volume and the gas volume generated by the added CBA suggests that, in the case of Celogen AZ 3990 (with a manufacturer-given gas generation factor of 220 cc/g) and polypropylene (having a density of about 0.9 g/cc), the amount of chemical blowing agent would be about 1% for three-fold expansion and about 2.5% for six-fold expansion. Too low a level of CBA results in a foam structure only partially expanded, owing either to a deficiency of gas produced, while too high a level of CBA also leads to poor cell structure, possibly owing to a decreased opportunity for polymer particulars to sinter in the dry-blended mixture, or to an increased opportunity for cells to coalesce during cell growth.

Because the melt strength and viscosity of PP both drop dramatically as temperature increases above the melting temperature, the effective processing temperature becomes of critical importance in obtaining good rotomolded PP foams. An increase in the processing time amounts to an increase in the processing temperature in rotomolding, so it is desirable that processing be stopped as soon as the expected volume expansion is obtained. For the same amount of starting materials, a higher oven temperature leads to a higher rate of heating of the rotomolding materials.

We found that very poor foam structures resulted when too high a rate of heating was used, presumably because of insufficient time for polymer particles to sinter together. For the particular mold used in these experiments, it was concluded that 300–350° C. was suitable for three-fold expansion while 250–300° C. was appropriate for six-fold expansion. In any experimental or commercial setup for the rotomolding of dry-blended polypropylene resins, however, the key point regarding temperature/time conditions is control of the oven temperature and of the heating rate so that good sintering is achieved.

(b) Melt Compounded Compositions

During the compounding process, it was observed that the proper selection of processing temperature and extrusion speed are essential to the quality of the compounded pellets. To compound the chemical blowing agent particles into the polymer melt, the processing temperature must be above the melting temperature of the polymer. However, it must be below the decomposition temperature of the chemical-blowing agent. If decomposition occurred in the compounding process, the generated bubbles could adversely affect cell nucleation in the foaming process. In addition, a certain amount of the blowing agent would thereby be lost, making it difficult to meter or control the amount of CBA used in the process.

Since a lot of heat is generated by viscous heating in an extruder, some local hot spots may form. Therefore, the extruder screw rotational speed should be low enough to prevent unnecessary viscous heating generated from the screw motion. The polymer flow rate is also a significant parameter. Since the residence time also affects CBA decomposition, the polymer flow rate through the extruder should be high enough. "Residence time" refers to the time during which the a materials are processed in the extruder. To minimize the decomposition of CBAs (at the compounding stage residence time should be as short as practicable, through high extrusion speed or high polymer flow rate.

As for mixing quality, it is also desirable to have a high extrusion speed, owing to the fact that the higher the rotational speed of the screw, the higher is the shear force and the better the mixing quality. Therefore, a proper extrusion speed should be selected for the particular materials processed. For the experiments we performed, a speed in the range of 30 to 50 RPM (and processing temperature from 160 to 165° C. were found to be effective) for the compounding of PP and any of Celogen AZ (i.e. azodicarbonamide), SAOFOAMP or HYDROCEROL (inorganic bicarbonate) as chemical blowing agent. This may be varied when the pair of polymer and CBA is changed.

(iv) Comparative Process Results

FIGS. 6 and 7 show the comparison of results from the dry-blending method and those from the compounding method.

FIG. 6 relates to rotomolding of SD812 (Montell) with a MFR of 16. SD 812 has long chain branching in the polymer structure and known to have a high melt strength. Because of its high melt strength, the degree of cell coalescence in the foam experiments on SD812 was expected to be very low, and a fine cell structure was obtained from the dry blending based foam processing. However, the obtained cell density was smaller than that of foams processed in the compounding method. In other words, the decomposition behaviour was relatively poorer in the dry process, presumably by reason of large plastic powder particles size and poor dispersion of CBAs.

A much finer foam structure was obtained after the compounding process, nucleation being governed only by the decomposition behaviour of the chemical blowing agent and polymer viscosity has little influence. The improved mixing quality of the chemical blowing agent particles in the polymer matrix also played an important role.

Advantages of the compounding method were distinguished when PF633 with a very low MFR was tested. From FIG. 5, it can be seen that no fully expanded foam structure could be obtained in the dry-blending case using PF633. Because of the high viscosity of the material, the sintering process was too slow to form a melted polymer matrix (to isolate the CBA particles) before the decomposition of the chemical blowing agents. As a result, most of the gases escaped through the connected air channels which were formed due to poor sintering. Because of the small amount of gas left, very low expanded foams were obtained.

On the other hand, after compounding, the chemical blowing agent particles were well isolated in the polymer matrix and very little gas was lost during the foaming process. Consequently, a uniform fine-cell foam structure was achieved. The experiments with PF633 indicate that the appropriate range of MFR of PP materials for rotational foam molding is wider for compounding-based than for dry-blending processing.

The melt strength of PP materials plays a critical role in determining final cell density and cell size in the compounding based-technique. As noted above, experiments on SD812 and PF633 show a great improvement over dry-blending through compounding. However, when experiments were conducted on MT4390 of MFR 20, no apparent improvement of the cell structure was observed by using compounding instead of dry-blending of the PP resin rotomolding composition components. It is believed that in the compounded resin/CBA mixture there is a very high density of nuclei formed at the onset of the foaming process, leading to undesirable cell coalescence if the resin is of low melt strength. Accordingly, low MFR or a branched PP of higher melt strength is preferred for compounding-based rotational molding of foamed PP resins.

(v) Conclusions

In summary, the dry-blending approach to rotomolding PP resins according to one embodiment of the invention was used to produce fine-cell PP foams with an expansion ratio of up to six-fold from resins exhibiting an MFR of at least about 15 dg/min.

If a foam structure of large volume expansion and fine cell structure is to be achieved, then high melt strength PP materials are preferred, to lessen the degree of cell coalescence. For this purpose, the melt compounding approach to rotomolding PP resins, according to the other embodiment of the invention, is to be preferred, since the high melt strength PP resins needed to achieve large volume expansion do not have good sintering properties (i.e. MFR<15 dg/min.).

We claim:

1. A process for the production of foamed polypropylene resins by rotational molding, consisting essentially of the steps of:
   (i) charging a mold with a physically dry-blended mixture of (a) a powdered polypropylene resin characterized by a melt flow rate sufficiently high to conduce to thorough sintering of the powdered resin under rotomolding conditions, and (b) a selected amount of chemical blowing agent capable of releasing gas to foam said powdered resin, at a temperature above the sintering temperature of the resin, in an amount to produce a selected volume expansion ratio; and
   (ii) rotationally molding said dry-blended mixture until it has expanded to said selected volume expansion ratio.

2. A process according to claim 1 wherein said melt flow rate is greater than about 15 dg/min.

3. A process according to claim 2, wherein said physically dry-blended mixture further comprises a control agent for lowering the effective decomposition temperature of said chemical blowing agent closer to said sintering temperature.

4. A process according to claim 3, wherein said control agent is zinc oxide.

5. A process according to claim 4, wherein said selective volume expansion ratio is between 3:1 and 6:1.

6. A process for the production by rotational molding of foamed polypropylene resin exhibiting large volume expansion and fine cell structure, consisting essentially of the steps of:

(i) blending a polypropylene resin characterized by high melt strength with a chemical blowing agent, at a processing temperature above the melting temperature of said resin and below the decomposition temperature of said blowing agent to produce a substantially uniform mixture;

(ii) extruding and pelletizing said uniform mixture; and (iii) rotationally molding the pelletized mixture until it has expanded to a selected volume expansion ratio.

7. A process according to claim 6, wherein zinc oxide is included with said polypropylene resin and said chemical blowing agent in the melt compounding process of step (i), as a control agent for lowering the decomposition temperature of said chemical blowing agent.

8. A process according to claim 6, wherein said chemical blowing agent is selected from the group consisting of azodicarbonamide, and inorganic bicarbonates.

* * * * *